(12) United States Patent
Rolandson

(10) Patent No.: US 11,719,199 B2
(45) Date of Patent: Aug. 8, 2023

(54) COMBUSTION ENGINE ASSEMBLY WITH AN ETHANOL REFORMER UNIT

(71) Applicant: Volvo Car Corporation, Gothenburg (SE)

(72) Inventor: Ola Rolandson, Vänersnäs (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/985,186

(22) Filed: Nov. 11, 2022

(65) Prior Publication Data
US 2023/0167789 A1    Jun. 1, 2023

(30) Foreign Application Priority Data

Nov. 30, 2021 (EP) .................................... 21211480

(51) Int. Cl.
*F02M 27/02* (2006.01)
*F02M 25/025* (2006.01)
*F02M 26/20* (2016.01)

(52) U.S. Cl.
CPC .......... *F02M 27/02* (2013.01); *F02M 25/025* (2013.01); *F02M 26/20* (2016.02)

(58) Field of Classification Search
CPC ....... F02M 27/02; F02M 25/025; F02M 26/20
See application file for complete search history.

(56) References Cited

U.S. PATENT DOCUMENTS

| | | | |
|---|---|---|---|
| 2008/0010993 A1* | 1/2008 | Morgenstern ........... | C01B 3/323 60/780 |
| 2012/0097117 A1* | 4/2012 | Morgenstern ............. | C01B 3/22 123/3 |
| 2015/0167588 A1* | 6/2015 | Beutel ....................... | C10L 3/00 48/213 |
| 2017/0333843 A1* | 11/2017 | Aoyagi .................... | F02D 19/08 |
| 2017/0361296 A1* | 12/2017 | Aoyagi ............... | F02D 19/0671 |
| 2018/0297843 A1* | 10/2018 | Lo .......................... | B01J 19/243 |
| 2019/0323458 A1 | 10/2019 | Voice et al. | |
| 2020/0182165 A1* | 6/2020 | Kokjohn ............. | F02D 19/0644 |

FOREIGN PATENT DOCUMENTS

WO    2019157581 A1    8/2019

OTHER PUBLICATIONS

May 19, 2022 European Search Report issued in corresponding International Application No. 21211480.

* cited by examiner

*Primary Examiner* — Xiao En Mo
(74) *Attorney, Agent, or Firm* — Clements Bernard Walker; Christopher L. Bernard

(57) ABSTRACT

An internal combustion engine assembly is provided with a fuel tank for fuel including ethanol, and a reformer for steam reforming of ethanol that is with an outlet connected to a buffer tank. A first reformer supply duct extends from the fuel tank to the reformer via a fuel evaporator that is in heat exchanging contact with the exhaust gases, for supplying ethanol vapor to the reformer. A second reformer supply duct extends from a water reservoir to the reformer via a water evaporator that is in heat exchanging contact with the exhaust gases. The reformer is in heat exchanging contact with the catalytic converter and is adapted for reforming ethanol and water into syngas including carbon monoxide and hydrogen, and for supplying the syngas via the outlet to the buffer tank. The reformer and the catalytic converter may form an integrated unit.

13 Claims, 2 Drawing Sheets

COMBUSTION ENGINE ASSEMBLY WITH AN ETHANOL REFORMER UNIT

CROSS-REFERENCE TO RELATED APPLICATION

The present disclosure claims the benefit of priority of co-pending European Patent Application No. 21211480.5, filed on Nov. 30, 2021, and entitled "Combustion Engine Assembly With an Ethanol Reformer Unit," the contents of which are incorporated in full by reference herein.

TECHNICAL FIELD

The disclosure relates to an internal combustion engine (ICE) assembly with a fuel tank for containing fuel including ethanol, the fuel tank being connected via a fuel supply line to a fuel inlet of at least one of a number of cylinders, the cylinders being with an outlet connected to an exhaust system including a catalytic converter. The disclosure also relates to a vehicle including such an internal combustion engine assembly and to an assembly of a catalytic converter and a steam reforming unit.

BACKGROUND

Fuel for internal combustion engines may contain varying amounts of ethanol. Bio-ethanol may constitute 10% (E10) to 85% (E85) of Bio-fuel mixtures. Fuel of the type E10 is used in 14 countries in Europe and increasing use of Bio-ethanol is part of the goal to reduce the dependency of fossil fuels.

As currently available Bio-fuels can only account for a part of the reduction in $CO_2$ emissions, the increase in efficiency of the ICE is of importance. One method for increasing the thermal efficiency of the ICE includes Waste Heat Recovery in combination with Fuel Reforming technology. Fuel reforming uses the heat available in the exhaust gases to upgrade a low carbon fuel to a higher energy level hydrogen fuel that is combusted, with a higher thermal efficiency of the ICE as a result.

Steam reforming of ethanol requires a relatively large amount of energy, and the temperature that is required for full conversion of ethanol is about 700K. It is known to provide an aqueous ethanol solution to a reformer that is heated by the high-temperature exhaust gases. In the reformer, syngas, consisting of CO and $H_2$ is formed that is fed to a separator that cools the mixed gas, condense water vapor and separates into gas and liquid. A recovery tank collects recovery solution separated by the separator, and hydrogen is fed to the cylinders of the ICE.

It is an object to provide a combustion engine assembly that is at least partly powered by bio-ethanol, using steam reforming of the ethanol with an increased efficiency.

SUMMARY

An internal combustion engine assembly according to the present disclosure includes a fuel tank for containing fuel including ethanol, the fuel tank being connected via a fuel supply duct to a fuel inlet of at least one of a number of cylinders, the cylinders being with an outlet connected to an exhaust system including a catalytic converter, a reformer for steam reforming of ethanol, being with an outlet connected to a buffer tank, that is connected to a fuel inlet of the cylinders, and a first reformer supply duct extending from the fuel tank to the reformer via a fuel evaporator that is in heat exchanging contact with the exhaust gases, for supplying ethanol vapor to the reformer, and a second reformer supply duct extending from a water reservoir to the reformer via a water evaporator that is in heat exchanging contact with the exhaust gases, for supplying water steam to the reformer, the reformer being in heat exchanging contact with the catalytic converter and being adapted for reforming ethanol and water into syngas including carbon monoxide and hydrogen, and for supplying the syngas via the outlet to the buffer tank.

By placing the fuel reformer in heat exchanging contact with the catalytic converter, the high temperatures in the range of 250° C.-500° C. that are required for steam conversion of ethanol can be effectively attained by heat transfer from the exhaust gases via the converter.

The endothermic process of the steam reforming in the reforming unit has a cooling effect on the catalytic converter and protects it from overheating.

The water reservoir may be formed by a tank or may include a condensation unit connected to the exhaust gas outlet.

The fuel reformer and the catalytic converter may the reformer and the catalytic converter may form an integrated unit. The integrated unit can be accommodated in a compact housing. In the unit, the exhaust gases are guided through channels with the exhaust catalyst having a relatively a large area cross-section, whereas the ethanol and steam are passed over the reformer catalyst through channels with a relatively small area cross-section. The integration of the catalytic converter and steam reformer into a single unit allows for efficient heat transfer.

The internal combustion engine assembly can include an exhaust water condenser, receiving at an inlet exhaust gases and being with an outlet connected to the water reservoir.

By condensing water from the exhaust gases, a continuous supply of water for the production of steam is available. The water reservoir can store water as a backup for the reforming process during startup of the engine when no water condensate is available from the exhaust gases yet. The reservoir may be part of the water condenser and can be formed by a lower part of the condenser.

The fuel evaporator and the exhaust water condenser may form an integrated unit.

The heat extraction from the exhaust gases in the fuel evaporator for the evaporation of ethanol from the fuel and the forming of ethanol steam, can effectively be used for the condensation of water from the exhaust gases.

The buffer tank containing the syngas that is formed by steam conversion of ethanol, may be connected with an outlet to a combustion device that is in heat conducting contact with the catalytic converter.

Under cold start conditions, the syngas may be used for heating up the catalyst so that it rapidly reaches its effective temperature range and attains light-off.

The water reservoir may be connected with a cooling outlet to the cylinders for cooling. The water injection may be effected via the same ducts through which syngas is injected into the cylinders, either in the form of water steam or in liquid form if the water has been condensed.

At maximum load conditions, the cylinders can be cooled, for instance by water injection into the cylinder, with excess water from the water reservoir.

BRIEF DESCRIPTION OF THE DRAWINGS

A number of embodiments will by way of non-limiting example, be described in detail with reference to the accompanying drawings. In the drawings.

DETAILED DESCRIPTION

Figure 1:
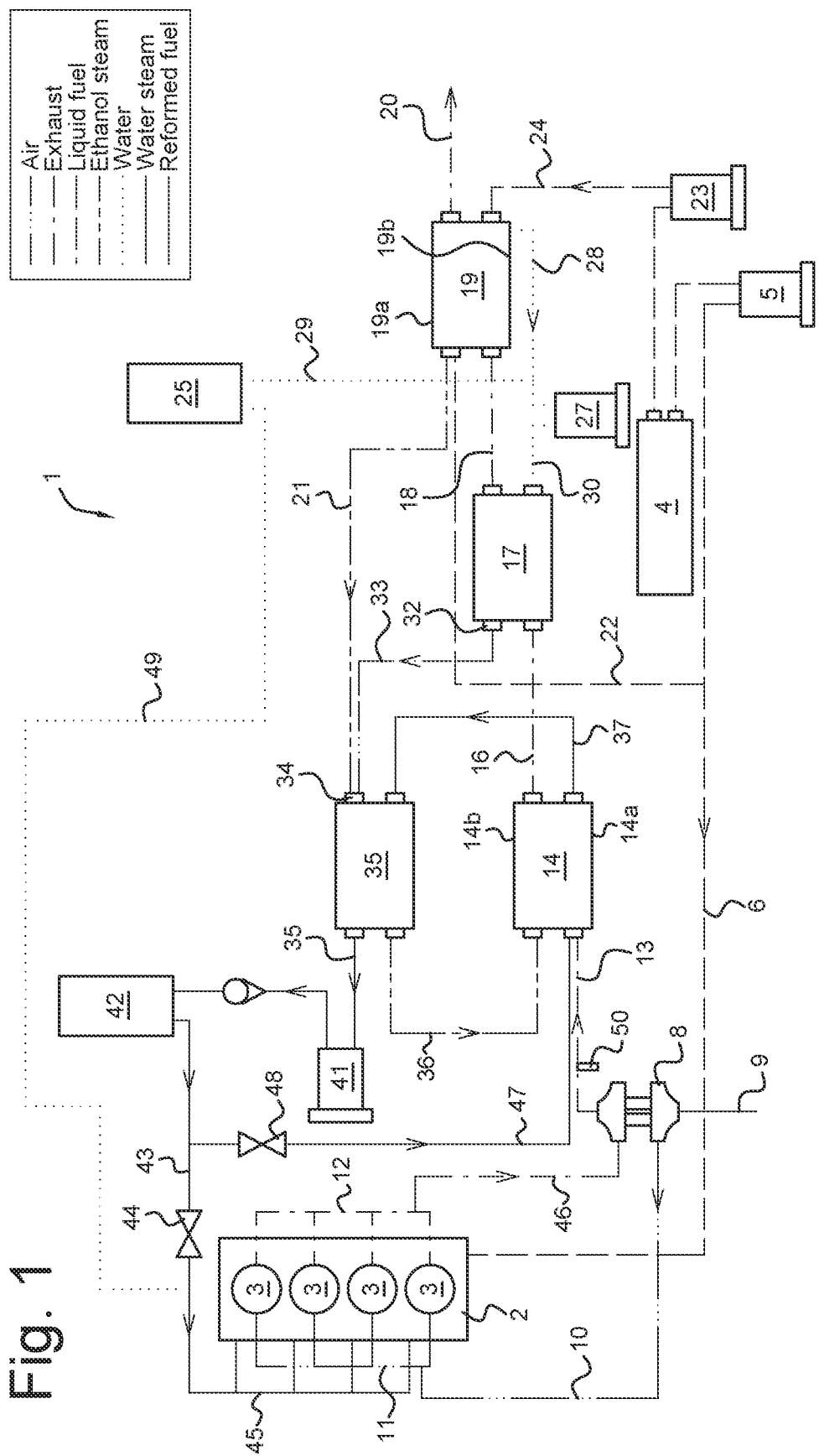
FIG. 1 shows a schematic overview of a combustion engine assembly including an ethanol steam reforming unit.

FIG. 1 shows an internal combustion engine assembly 1 with an internal combustion engine 2 having four cylinders 3. A fuel tank 4 containing bio-ethanol, for instance in the form of an E10 type of fuel, is connected to the cylinders 3 via a fuel pump 5 and a fuel supply duct 6.

A turbocharger 8 compresses the air that is supplied from an air intake 9 and transports the intake air through an air duct 10 to the intake manifold 11 for supply to the cylinders 3. The exhaust gases of the fuel that has been burned in the cylinders 3, leave the engine 2 via an exhaust manifold 12 and flow through an exhaust duct 46 to drive the turbocharger 8. After passing the turbocharger 8, the exhaust gases pass via the duct 13 into an integrated catalytic converter/fuel reformer unit 14. Via an exhaust duct 16, the exhaust gases pass to a water evaporator 17 and from there via exhaust duct 18 to a fuel evaporator/water condenser unit 19 that includes fuel evaporator 19a and water condenser 19b. On leaving the fuel evaporator/water condenser unit 19, the exhaust gases pass to a tail pipe 20 to be expelled into the ambient.

A second fuel pump 23 supplies bio-fuel from the tank 4 to the fuel evaporator/water condenser unit 19 where the fuel, that is at ambient temperature, is brought in heat exchanging contact with the exhaust gases. The ethanol that is evaporated from the fuel is supplied via a duct 21 to an inlet 34 of a pre-heater/cooler unit 35. The fuel that passes through the evaporator/water condenser unit 19 in a liquid state, is transported via a duct 22 to the fuel supply duct 6. In the fuel evaporator/water condenser unit 19, water is condensed from the exhaust gases and is stored in a water tank 25 via water outlet duct 28, water pump 27 and duct 29.

The water that has been condensed in the unit 19 and/or that is supplied from the water tank 25 by the pump 27, is evaporated in the water evaporator 17 and is passed as steam to the outlet 32. Through a water steam supply duct 33, the water steam enters into a pre-heater/cooler unit 35.

Ethanol that is evaporated from the fuel in the fuel evaporator/water condenser unit 19, is also supplied to the inlet 34 via the duct 21. Both ethanol and water steam are mixed in the pre-heater/cooling unit 35, the mass ratio being controlled by the pump mass flow. The pre-heated water steam and ethanol steam mixture is fed from the unit 35 to the integrated catalytic converter/fuel reformer unit 14 through duct 36, where the water and steam are transformed into syngas.

The syngas that is formed in the integrated catalytic converter/fuel reformer unit 14 is transported via a syngas outlet duct 37, through the pre-heater/cooler unit 35 and preheats the water and ethanol by being brought in heat exchanging contact with the water/ethanol steam that is supplied at inlet 34.

Via an outlet duct 40 and a pump 41, the syngas is supplied to a buffer tank 42 in which it is stored in compressed form. From the buffer tank 42, the syngas is transported via a gas supply duct 43 and a reduction valve 44 to a gas inlet manifold 45 that is connected to the cylinders 3.

Through a syngas duct 47 and a catalyst heating valve 48, the syngas may be supplied to the catalytic converter/fuel reformer unit 14 and ignited by a glow plug 50 for heating of the unit 14 in case the exhaust gas temperature is not sufficiently high.

From the water reservoir 25, a cooling duct 49 may extend to the engine 2 for injection of cooling water into the cylinders 3 at maximum power to maintain a lambda value of the air to fuel ratio at 1 and cool the engine at maximum load points.

Figure 2:
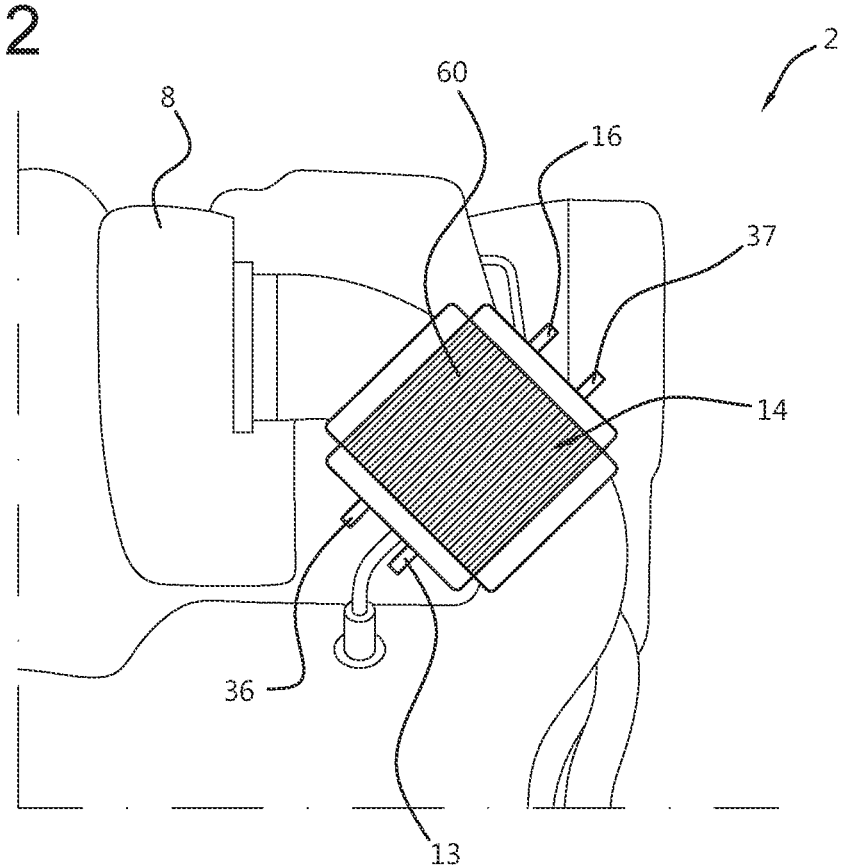
FIG. 2 shows an ICE having an integrated catalytic converter/fuel reformer unit.

FIG. 2 schematically shows the ICE 2 with the catalytic converter/fuel reformer unit 14 including the steam reformer 14b and the catalytic converter 14a contained in a single housing 60. The housing 60 is at the inlet connected via the duct 13 to an exhaust duct 46. The water/ethanol steam mixture is supplied to the housing 14 via the duct 36. A syngas outlet duct 37 and an exhaust outlet duct 16 of the unit 14 are connected to unit 35 and to the evaporator 17, respectively, that are not shown in the figure.

Figure 3A:
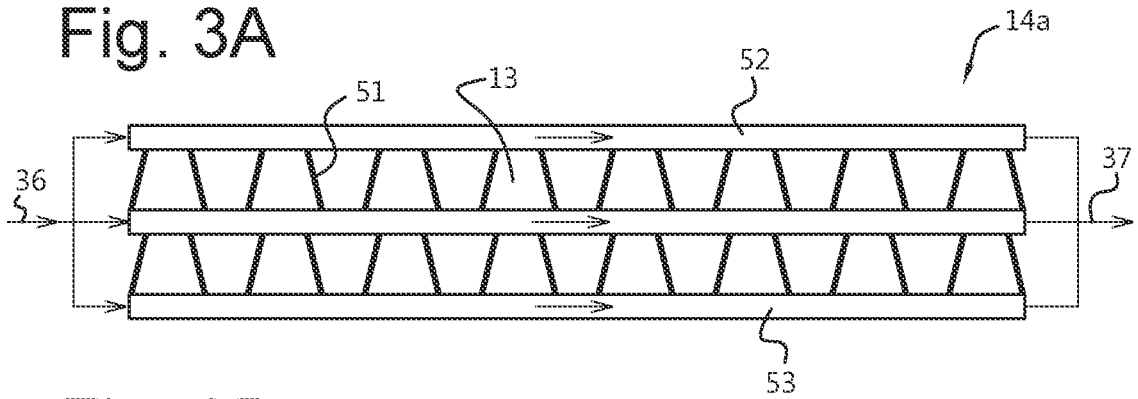
FIGS. 3a and 3b show a detail of the converter section and of the fuel reformer section of an integrated catalytic converter/fuel reformer unit.

The converter part 14a of the unit 14 may be formed by a three way catalyst (TWC) and is shown in FIG. 3a. The reformation gases are supplied through the duct 36 and pass through the flow channels 52, 53 and exit through outlet duct 37. The exhaust gases flow through the duct 13, perpendicular to the plane of the drawing, and are passed across a catalyst 51 with a relatively large cross-sectional area, to the exhaust duct 16.

Figure 3B:
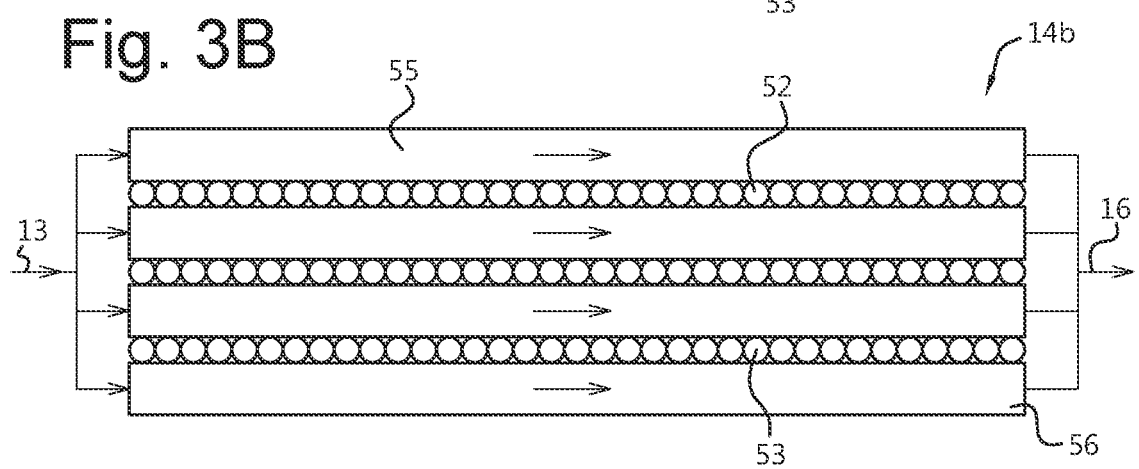

FIG. 3b shows the ethanol reformer part 14b of the unit 14. Ethanol steam and water steam are entered into the reformer flow channels 52,53 in a flow direction that is perpendicular to the plane of the drawing. The reformer catalyst in the flow channels 52,53 is packed in a bed with a relatively small cross-sectional area. Exhaust gases flow through duct 13 and pass over catalyst 51 in the channels 55, 56, to the exhaust duct 16.

The invention claimed is:

1. An internal combustion engine assembly, comprising:
a fuel tank for containing fuel comprising ethanol, the fuel tank being connected via a fuel supply duct to a fuel inlet of at least one of a number of cylinders, the cylinders being with an outlet connected to an exhaust system comprising a catalytic converter,
a reformer for steam reforming of ethanol, being with an outlet connected to a buffer tank, that is connected to a fuel inlet of the cylinders, and
a first reformer supply duct extending from the fuel tank to the reformer via a fuel evaporator that is in heat exchanging contact with the exhaust gases, for supplying ethanol vapor to the reformer, and a second reformer supply duct extending from a water reservoir to the reformer via a water evaporator that is in heat exchanging contact with the exhaust gases, for supplying water steam to the reformer,
the reformer being in heat exchanging contact with the catalytic converter and being adapted for reforming ethanol and water into syngas comprising carbon monoxide and hydrogen, and for supplying the syngas via the outlet to the buffer tank.

2. The internal combustion engine assembly according to claim 1, the reformer and the catalytic converter forming an integrated unit.

3. The internal combustion engine assembly according to claim 1, comprising an exhaust water condenser receiving at an inlet exhaust gases and being with an outlet connected to the water reservoir.

4. The internal combustion engine assembly according to claim 3, the fuel evaporator and the exhaust water condenser forming an integrated unit.

5. The internal combustion engine assembly according to claim 1, wherein the buffer tank is connected with an outlet to a combustion device that is in heat conducting contact with the catalytic converter.

6. The internal combustion engine assembly according to claim 1, the water reservoir being with a cooling outlet connected to the cylinders for cooling of the cylinders.

7. A vehicle, comprising:
an internal combustion engine assembly, comprising:
a fuel tank for containing fuel comprising ethanol, the fuel tank being connected via a fuel supply duct to a fuel inlet of at least one of a number of cylinders, the cylinders being with an outlet connected to an exhaust system comprising a catalytic converter,
a reformer for steam reforming of ethanol, being with an outlet connected to a buffer tank, that is connected to a fuel inlet of the cylinders, and
a first reformer supply duct extending from the fuel tank to the reformer via a fuel evaporator that is in heat exchanging contact with the exhaust gases, for supplying ethanol vapor to the reformer, and a second reformer supply duct extending from a water reservoir to the reformer via a water evaporator that is in heat exchanging contact with the exhaust gases, for supplying water steam to the reformer,
the reformer being in heat exchanging contact with the catalytic converter and being adapted for reforming ethanol and water into syngas comprising carbon monoxide and hydrogen, and for supplying the syngas via the outlet to the buffer tank.

8. The vehicle according to claim 7, the reformer and the catalytic converter forming an integrated unit.

9. The vehicle according to claim 7, comprising an exhaust water condenser receiving at an inlet exhaust gases and being with an outlet connected to the water reservoir.

10. The vehicle according to claim 9, the fuel evaporator and the exhaust water condenser forming an integrated unit.

11. The vehicle according to claim 7, wherein the buffer tank is connected with an outlet to a combustion device that is in heat conducting contact with the catalytic converter.

12. The vehicle according to claim 7, the water reservoir being with a cooling outlet connected to the cylinders for cooling of the cylinders.

13. An assembly, comprising:
a catalytic converter,
an ethanol steam reformer, and
a housing containing the converter and the reformer, each having separate fluid flows and containing heat exchange means for exchange of heat between the reformer and the converter.

* * * * *